US008516538B2

(12) United States Patent
Akeel et al.

(10) Patent No.: US 8,516,538 B2
(45) Date of Patent: *Aug. 20, 2013

(54) PROVIDING SECURITY FOR QUERIES TO ELECTRONIC PRODUCT CODE INFORMATION SERVICES

(75) Inventors: Umair Akeel, Burlingame, CA (US); Steven P. Beier, San Jose, CA (US); Valer-Alin Crisan, San Jose, CA (US); Gautham B. Pai, Hiriadka (IN); Ralf Rantzau, San Jose, CA (US)

(73) Assignee: Frequentz LLC, Del Mar, CA (US)

( * ) Notice: Subject to any disclaimer, the term of this patent is extended or adjusted under 35 U.S.C. 154(b) by 1104 days.

This patent is subject to a terminal disclaimer.

(21) Appl. No.: 11/670,245

(22) Filed: Feb. 1, 2007

(65) Prior Publication Data

US 2008/0189758 A1     Aug. 7, 2008

(51) Int. Cl.
*H04L 29/06* (2006.01)
(52) U.S. Cl.
USPC .............. 726/1; 726/2; 726/3; 726/4; 726/26; 726/27

(58) Field of Classification Search
None
See application file for complete search history.

(56) References Cited

U.S. PATENT DOCUMENTS

| | | | |
|---|---|---|---|
| 4,601,223 A | 7/1986 | Chomby | |
| 5,335,346 A | 8/1994 | Fabbio | |
| 5,956,400 A | 9/1999 | Chaum et al. | |
| 6,253,203 B1 | 6/2001 | O'Flaherty et al. | |
| 6,308,163 B1 * | 10/2001 | Du et al. | 705/7.25 |
| 6,430,561 B1 | 8/2002 | Austel et al. | |
| 6,480,850 B1 | 11/2002 | Veldhuisen | |
| 6,578,037 B1 | 6/2003 | Wong et al. | |
| 6,618,721 B1 | 9/2003 | Lee | |
| 6,769,074 B2 | 7/2004 | Vaitzblit | |
| 6,820,082 B1 | 11/2004 | Cook et al. | |
| 6,901,304 B2 | 5/2005 | Swan et al. | |
| 7,091,861 B2 | 8/2006 | Schmidtberg et al. | |

(Continued)

FOREIGN PATENT DOCUMENTS

EP     1089200 A2     4/2001

OTHER PUBLICATIONS

Radko, John et al., "Network Data Sharing Panel Discussion", EPC DevCon, 2005. Retrieved Dec. 26, 2006 <http://www.epcdevcon.com/agenda.html#0100000D>.

(Continued)

*Primary Examiner* — Jeffrey Pwu
*Assistant Examiner* — Thomas C Lauzon
(74) *Attorney, Agent, or Firm* — Mollborn Patents, Inc.; Fredrik Mollborn

(57) ABSTRACT

Methods and apparatus, including computer program products, implementing and using techniques for protecting data residing in a repository of an electronic product code information service against undesired data disclosure. One or more disclosure policies are defined for an item tagged with an electronic product code. The item has associated data stored in the repository. The disclosure policies describe one or more of: who is permitted to query the repository for information, what type of information is permitted to be obtained from the repository in response to a query, and under what condition the repository can be queried. The disclosure policies are enforced in response to a received query from a party by only disclosing a subset of the data from the repository, the subset being determined in accordance with the defined one or more disclosure policies. A web-based tool for defining disclosure policies is also described.

12 Claims, 5 Drawing Sheets

(56) References Cited

U.S. PATENT DOCUMENTS

| | | | |
|---|---|---|---|
| 7,096,219 B1* | 8/2006 | Karch | 1/1 |
| 2001/0054155 A1 | 12/2001 | Hagan et al. | |
| 2002/0091741 A1 | 7/2002 | Ferreira et al. | |
| 2004/0222878 A1 | 11/2004 | Juels | |
| 2004/0233040 A1 | 11/2004 | Lane et al. | |
| 2005/0038783 A1 | 2/2005 | Lei et al. | |
| 2005/0097149 A1 | 5/2005 | Vaitzblit et al. | |
| 2005/0137904 A1 | 6/2005 | Lane et al. | |
| 2005/0144176 A1 | 6/2005 | Lei et al. | |
| 2005/0165799 A1* | 7/2005 | Wong | 707/100 |
| 2005/0289342 A1 | 12/2005 | Needham et al. | |
| 2006/0033608 A1 | 2/2006 | Juels et al. | |
| 2006/0047789 A1 | 3/2006 | Kumar et al. | |
| 2006/0059567 A1 | 3/2006 | Bird et al. | |
| 2006/0106718 A1 | 5/2006 | Spellman et al. | |
| 2006/0108411 A1 | 5/2006 | Macurek et al. | |
| 2006/0112123 A1* | 5/2006 | Clark et al. | 707/101 |
| 2006/0124722 A1 | 6/2006 | Williams et al. | |
| 2006/0145812 A1 | 7/2006 | Sajkowsky | |
| 2006/0148443 A1 | 7/2006 | Burg et al. | |
| 2006/0149566 A1 | 7/2006 | Lin et al. | |
| 2006/0149635 A1 | 7/2006 | Bhatti et al. | |
| 2006/0163338 A1 | 7/2006 | Allen et al. | |
| 2006/0168112 A1 | 7/2006 | Weng et al. | |
| 2006/0173845 A1* | 8/2006 | Handy-Bosma et al. | 707/9 |
| 2006/0208885 A1 | 9/2006 | Lin | |
| 2006/0237547 A1 | 10/2006 | Barenburg et al. | |
| 2006/0248592 A1 | 11/2006 | Agrawal et al. | |
| 2006/0250248 A1 | 11/2006 | Tu et al. | |
| 2006/0277061 A1 | 12/2006 | Revanur et al. | |
| 2007/0043827 A1* | 2/2007 | Banerjee | 709/218 |
| 2007/0050305 A1 | 3/2007 | Klein | |
| 2007/0055586 A1* | 3/2007 | Lucas | 705/28 |
| 2007/0156281 A1 | 7/2007 | Leung et al. | |
| 2007/0179954 A1 | 8/2007 | Kudoh et al. | |
| 2007/0276835 A1* | 11/2007 | Murthy | 707/9 |
| 2008/0109411 A1 | 5/2008 | Young et al. | |
| 2008/0157927 A1* | 7/2008 | Soppera et al. | 340/10.1 |
| 2008/0157932 A1* | 7/2008 | Winkler | 340/10.6 |
| 2008/0157933 A1* | 7/2008 | Winkler | 340/10.6 |
| 2008/0284597 A1* | 11/2008 | Shah | 340/572.1 |

OTHER PUBLICATIONS

Asher, C., "EPCIS—Building the Infrastructure to Support the Technology", NACDS 2006. Retrieved Dec. 26, 2006 <http://meetings.nacds.org/RFID/2006/education_sessions.cfm?Log=1>.

Advisory action received in related U.S. Appl. No. 11/562,184, dated Jan. 5, 2010.

Final office action received in related U.S. Appl. No. 11/562,184, dated Nov. 6, 2009.

Non-final office action received in related U.S. Appl. No. 11/562,184, dated Mar. 5, 2010.

Non-final office action received in related U.S. Appl. No. 11/562,184, dated Apr. 30, 2009.

Verisign EPC Network Services, EPC Information Service Implementation Guide, Version 1.5, Aug. 2004.

PCT Notification of Transmittal of the International Search Report and the Written Opinion of the International Searching Authority, or the Declaration. Date of mailing Mar. 12, 2008. PCT/EP2007/062389.

Document XP002456414. "Statement in accordance with the Notice from the European Patent Office dated Oct. 1, 2007 concerning business methods (OJ Nov. 2007; pp. 592-593)."

Verisign, "EPC Network Architecture", 2004.

Konidala et al., "Mobile RFID Security Issues", SCIS 2006, Symposium on Cryptography and Information Security, Hiroshima, Japan, Jan. 17-20, 2006.

Traub et al., "The EPCglobal Architecture Framework", EPCglobal, 2005, 2004.

Song et al., "Security Enhanced RFID Middleware System", Enformatika v.10 Dec. 2005: 79-82.

Kristen LeFevre, Rakesh Agrawal, Vuk Ercegovac, Raghu Ramakrishnan, Yirong Xu, David DeWitt, Limiting Disclosure in Hippocratic Databases, Aug. 31-Sep. 3,2004, Procedings of the Thirtieth International Conference on Very Large Databases vol. 30, pp. 108-119.

govt. oracle .com/tkyte/article2/index. html.

eXtendible access control markup language (XACML) version 1.0 specification, Feb. 2003, OASIS.

I. Fundulaki and A. Sahuguet, Share Your Data, Keep Your Secrets: A Language-Based approach for Privacy conscious Integration of SML User Profiles, Technical report, pp. 1-12, Bell Laboratories, Lucent Technologies, 2003.

N. Adam and J. Wortman, Security control methods for statistical databases: A Comparative Study, ACM Computing Surveys, 21(4), 515-556, Dec. 1989.

R. Agrawal, J. Kiernan, R. Srikant, and Y. Xu, Hippocratic databases, In Proc. of the 28th Int. Conf on Very Large Data Bases, Hong Kong, China, Aug. 2002.

P. Ashley and D. Moore, Enforcing privacy within an enterprise using IBM Tivoli Privacy Manager for a business, May 2003.

R. Ashley, S. Hada, G. Karjoh, C. Powers, and M. Schunter, Enterprise privacy authorization language 1.1 (EPAL 1.1) speCification, IBM Research Report, Jun. 2003.

D. Bell and L. LaPadula, Secure computer systems: Unified exposition and multics-intepretation, Technical Report ESD TR 75 306, MITRE Corp., Bedford, Mass., Mar. 1976.

D. Chamberlain, A Complete Guide to DB2 Universal Database, Morgan Kauffmann, San Francisco, California, USA, 1998, Chapter 1.3.3.

L. Cranor, M. Langhelnrich, M. Marchiori, M. Pressler Marshall, and J. Reagle, The platform for privacy preferences 1.0 (P3P1.0) specification, W3C Recommendation, Apr. 2002.

D. Denning, T. Lunt, R. Schell, W. Shockley, and M. Heckman, The SeaView security model, IEEE Trans. on Software Eng., 16(6):593-607, Jun. 1990.

D. DeWitt, The Wisconsin benchmark: Past, present, and future, In J. Gray, editor, The Benchmark Handbook, Morgan Kaufmann, 1993.

V. Doshi, W. Herndon, S. Jajodia, and C. McCollum, Benchmarking multilevel secure database systems using the MITRE benchmark, In 10th Annual Computer Security Applications Conf., Dec. 1994.

S. Jajodia and R. Sandhu, Polyinstaliation integrity in multilevel relations, IEEE Computer Society Symp. on Research in Security and Privacy, May 1990.

S. Jajodia and R. Sandhu, A novel decomposition of multilevel into single level relations, IEEE Symp. on Security and Privacy, Oakland, California.

N. Kabra, R. Ramakrishnan, and V. Ercegovac, The QUIQ Engine: A hybrid IR DB system, In Proc. Int. Conf. on Data Engineering, Bangalore, India, Mar. 2003.

X. Qian and T. Lunt, Tuple level vs. element level classification, In Database Security, VI: Status and Prospects Results of the IFIP WG 11.3 Workshop on Database Security, Vancouver, Canada, Aug. 1992.

R. Ramakrishnan and J. Gehrke, Database Management Systems, McGraw Hill, 3rd edition, 2003, Chapter 21.

R. Sandhu, E. Coyne, H. Feinstein, and C. Youman, Role based access control models, IEEE Computer, 29 (2):38-47, Feb. 1996.

G. Wiederhold, M. Bilello, V. Sarathy, and X. Qian, A Security Mediator for Health Care Information, Proceedings of the 1996 AMIA Conference, Washington, D.C., Oct. 1996.

* cited by examiner

PROVIDING SECURITY FOR QUERIES TO ELECTRONIC PRODUCT CODE INFORMATION SERVICES

BACKGROUND

This invention relates to security management of electronic product code information. Electronic Product Codes (EPC) is a family of coding schemes for RFID (Radio Frequency IDentification) tags. The EPC is designed to meet the needs of various industries, while guaranteeing the uniqueness for all EPC-compliant tags. All EPC numbers contain a header identifying the encoding scheme that has been used. This in turn dictates the length, type and structure of the EPC. EPC coding schemes typically contain a serial number which can be used to uniquely identify a single object. For example, a 96-bit EPC number allows approximately $1.3 \times 10^{16}$ items to be coded annually, roughly corresponding to the number of grains of rice consumed globally each year.

The RFID and EPC technologies provide the basis for new traceability applications for items such as products to emerge everywhere. In this document, the term product refers to any physical object or item that is associated with an EPC. Parties that want to share their data in order to create increased business value need new mechanisms for querying traceable data. In addition to business considerations, companies are more likely to share their data if the services infrastructure is scalable, secure and easy to use.

The EPCglobal Network architecture describes components and interfaces for EPC-related information exchange between servers that contain information about items identified by EPC numbers. The servers, typically known as EPCISs (EPC Information Services), which are linked through a set of network services, store relevant product information related to specific EPC numbers. Typically, events are submitted directly from systems that sense EPCs, such as RFID readers and 1D- or 2D-barcode scanners. Events can also be submitted from systems that have received RFID data and "cleaned up" the data, for example, by applying filtering and transformation on the raw data events delivered by the RFID sensors. For example, a submitted event can describe a read operation of an RFID reader or an aggregation operation, where a set of EPCs is associated with another EPC. Such an aggregation operation can occur, for example, when several RFID-tagged items are packed into a container which is itself tagged with an RFID chip. The EPCISs are typically queried by other EPCIS systems, by extract-transform-load (ETL) systems that extract bulk data from the EPCIS and import the extracted data into a data warehouse for business intelligence applications, or by other customized applications that continuously monitor events.

The need for protecting information traces of items in supply chains is a challenge, in particular in new information infrastructures such as the EPCglobal networks, where partners want to share information, such as EPC events, with the help of EPCIS repositories. The current EPCglobal standard does not require EPCIS implementations to enforce authorization of queries, but suggests ideas of how an EPCIS could react in order to provide some notion of authorization. Some of the suggested reactions described in the standard document state that the EPCIS service could refuse to honor the request altogether, that the service could respond with less data than requested and that the service could hide information. However, no details are provided as to how these suggested reactions could be implemented in a secure way.

SUMMARY

In general, in one aspect, the invention provides methods and apparatus, including computer program products, implementing and using techniques for protecting data residing in a repository of an electronic product code information service against undesired data disclosure. One or more disclosure policies are defined for an item tagged with an electronic product code. The item has associated data stored in the repository. The disclosure policies describe one or more of: who is permitted to query the repository for information, what type of information is permitted to be obtained from the repository in response to a query, and under what condition the repository can be queried. The disclosure policies are enforced in response to a received query from a party by only disclosing a subset of the data from the repository, the subset being determined in accordance with the defined one or more disclosure policies.

In general, in another aspect, the invention provides methods and apparatus, including computer program products, implementing and using techniques for defining disclosure policies for data residing in a repository of an electronic product code information service. A user interface is presented through which a user can define one or more disclosure policies for the data residing in the repository. User input defining the one or more disclosure policies is received. The defined disclosure policies are applied to the data residing in the repository.

The various embodiments of the invention can realize one or more of the following advantages. Standard compliant implementations are provided that fulfill the suggestions about "query authorization" of the current EPCIS standard. As a result, users of EPCIS implementations do not need to be concerned about the security of their EPC-related information assets inside EPCIS repositories. By using master data to describe the conditions under which event data is disclosed, significantly less overhead is needed to ensure security for a potentially large number of events associated with a product. Data disclosure for entire product classes, that is, several individual items, can be controlled. In particular, the disclosure control can be based on specific product details such as brand, country of origin, or based on detailed location information about where the item was sensed, such as GPS coordinates, postal address, name of a distribution center, and so on.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Overview

Figure 1:
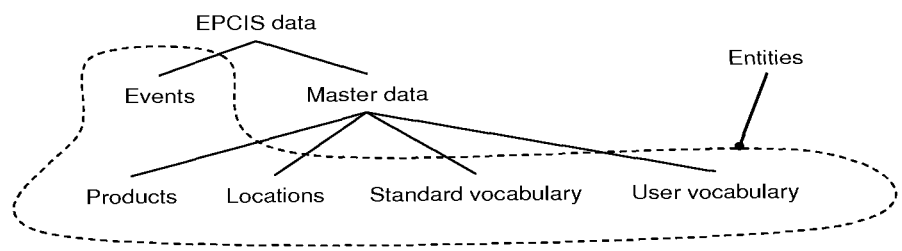
FIG. 1 shows a schematic view of an entity in accordance with one embodiment of the invention.

The need for protecting information traces of items in supply chains is a challenge, in particular in new information infrastructures such as the EPCglobal networks, where partners want to share information (typically EPC events) with the help of EPCIS repositories. The EPCIS query interfaces allow retrieval of events related to EPCs that have been submitted to the EPCISs' event capture interfaces, as well as information about the items that are associated with the EPCs.

These two kinds of data are referred to as event data and master data, respectively. Event data arises in the course of carrying out business processes, and is captured through an EPCIS Capture Interface and made available for query through the EPCIS Query Interfaces. Master data is additional data that describes a company's vocabulary, that is, the business entities, terminology, definitions and classifications used to describe business information, and that provides the necessary context for interpreting the event data. Informally, event data and master data can be understood as follows. Event data grows in quantity as more business is transacted, and refers to things that happen at specific moments in time. An example of event data is "At 1:23 pm on 15 Mar. 2004, EPC X was observed at Location L." Master data, on the other hand, does not generally grow merely because more business is transacted (though master data does tend to grow as organizations grow in size), is not typically tied to specific moments in time (though master data may change slowly over time), and provides interpretation for elements of event data. An example of master data is "Location L refers to the distribution center located at 123 Elm Street, Anytown, US." The rate of change to master data over time is generally expected to be very slow relative to the rate at which new event data is generated. Other examples of master data include locations of EPC sensing devices, such as the position of RFID readers inside a warehouse ("dock door 5" or "store floor" or "shelf G-16"), and product details such as color, size, or a best-before date for perishable goods.

The various embodiments of the invention described herein provide methods and apparatus that provide security and privacy for the query interface of EPCIS. A partner that queries an EPCIS can retrieve only those data values of an attribute in a query result object for which a policy rule has been specified for the attribute, and the condition of the policy rule is fulfilled for the result object. If no policy rule has been specified, the value is missing (or NULL in SQL terminology).

The various embodiments described herein provide methods for data disclosure enforcement for queries against EPCIS, which can use master data to control the data disclosure of query results, as well as tools for managing security policies that are used by the disclosure control methods. The methods include policy-based, role-based, fine-grained (cell-level) data disclosure control for EPC information, which encompasses both event information and master data, to protect unwanted disclosure of query results against EPCIS repositories. A data disclosure control technique is applied based on query rewriting. Queries that are submitted to an EPCIS through a query interface are intercepted transparently, that is, the querying partner does not have to know whether any security policies have been used to filter or suppress information stored by the EPCIS.

The tools for managing security policies, which will be described in detail below, have an intuitive graphical user interface that allows users to specify security policies for different user roles. The security policies pertain to which event attribute values and what master data attribute values can be disclosed and under what conditions. In some embodiments the tools allow one or more of creation, modification, deletion, activation and deactivation, and import and export of policies. The import and export functionality for policies is useful to easily deploy security policies in other EPCIS once the security policies have been defined for one EPCIS. In some embodiments the exported artifact is an XML file that has a well-defined document format.

In accordance with various embodiments of the invention, master data is used to describe the conditions under which event data is disclosed. As a result, the overhead needed to ensure security for a potentially large number of events associated with a product is greatly reduced. Typically, parties in a supply chain are not interested in ensuring the data visibility for a single EPC event or a single item (that is, an instance of a product), although, of course, this can also be done using the methods and apparatus in accordance with the various embodiments described herein. Instead, supply chain partners are typically interested in controlling data disclosure for an entire product class, that is, several items, and in particular based on specific product details, such as brand or country of origin, or based on detailed location information about where the item was sensed, such as GPS coordinates, postal address, name of a distribution center, and so on, which can all be described by master data.

As an illustrative example, consider a pharmaceutical wholesaler that manages its own EPCIS installation. The wholesaler has as partners $M_1$ and $M_2$, which are two competing pharmaceutical manufacturers that each delivers events to the wholesaler's EPCIS and query the EPCIS to track shipments. The wholesaler also has partners $P_1$ and $P_2$, which are two competing pharmacies. Pharmacy $P_1$ orders painkillers only from manufacturer $M_1$ and no products from manufacturer $M_2$. Pharmacy $P_2$ orders any type of products from both manufacturers $M_1$ and $M_2$. The EPCIS of the wholesaler receives EPC events about shipments from each partner. Each partner must also have access to their information in the wholesaler's EPCIS in order to manage their inventory and to track their shipments. To enable secure sharing of data, the EPCIS must ensure that $M_1$ is not able to query data pertaining to products of $M_2$ and vice versa, since they are competitors and want to protect their information assets. Furthermore, the EPCIS should allow each of $P_1$ and $P_2$ to see only shipment event information destined to them, respectively. $P_1$ should not be able to query for shipment and product detail information other than pain killers. How this is accomplished will now be explained in further detail with reference to the drawings. As the skilled reader realizes, the description is not limited to the specific examples described herein, but should rather be viewed as explanatory examples of embodiments of the invention, as defined in the claims.

Entities

In some embodiments of the invention, the objects referenced in policy rules are defined on a higher conceptual level than objects of the EPCIS repository, thus shielding the user from implementation details when using the graphical user interface of the policy-definition tool, as will be described below. These high-level objects, referenced to by the policies, are referred to herein as entities. The entity concept is schematically illustrated in FIG. 1. As can be seen in FIG. 1, the EPCIS standard describes two types of data: events and master data. The master data, in turn, can include different types of context information, such as products, locations and vocabularies. Example attributes of products are the brand name or a stock keeping unit (SKU) identifier. Locations can have attributes like address, read point, or business location name. A vocabulary is the set of permissible values that can appear in an event or master data attribute, such as a set of available location names. Vocabularies typically provide context and define standard terms for business steps, dispositions, and transaction types. It should be noted that the term "entity"

is not used herein as a database term (that is, it does not mean "entity" according to the entity-relationship (ER) model). An entity is any one of: event, location, product, further context that may be specified in a vocabulary.

As a result of providing an entity abstraction of the information specified in a physical data model, a person defining security policies does not need to have the skills or knowledge of a database administrator. For example, the person defining the security policies does not need to know that EPC values are stored in an EPCList table but can only see that an EPC is one among several attributes of an entity named event, or that an address is an attribute of an entity named location, or that brand is an attribute of the an entity named product, as will be discussed in further detail below with reference to FIG. 5. The linking of events, products, locations, and further context information with each other and the linking of all lower-level objects that belong to an entity is done transparently to the user issuing the query.

The structure of the physical data model, including the relationships between entities, is defined in the metadata. Additionally, metadata allows the administrator of an EPCIS to define extensions to the EPCIS standard schema for events and master data, such as new attributes for events or for products. In some embodiments of EPCISs, metadata is defined in the form of XML documents that conform to defined XML schemas and that are used by a software component to create (deploy) the physical data model. This lower-level data model consists of several relational database objects for each entity as well as several database relations for security policies.

Physical Data Model

Figure 2:
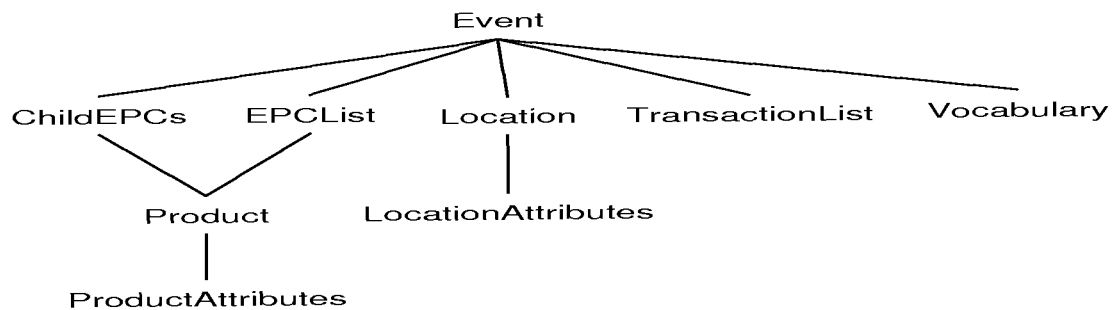
FIG. 2 shows an excerpt of a data schema in accordance with one embodiment of the invention.

The user who sets up security policies does not need to be aware that the entities in the EPCIS repository are represented using a different data model, such as a relational database schema. A small excerpt of the schema used in one implementation of EPCIS is schematically illustrated in FIG. 2. As can be seen in FIG. 2, in the illustrated implementation, the events have a relationship with location details. In fact, according to the EPCIS standard, there are two relationships; a first relationship for the business location and a second relationship for the RFID reader location, but only one relationship type is shown in FIG. 2, for the sake of clarity. The location attributes can be represented by a separate LocationsAttributes table.

Query Execution Control

Figure 3:
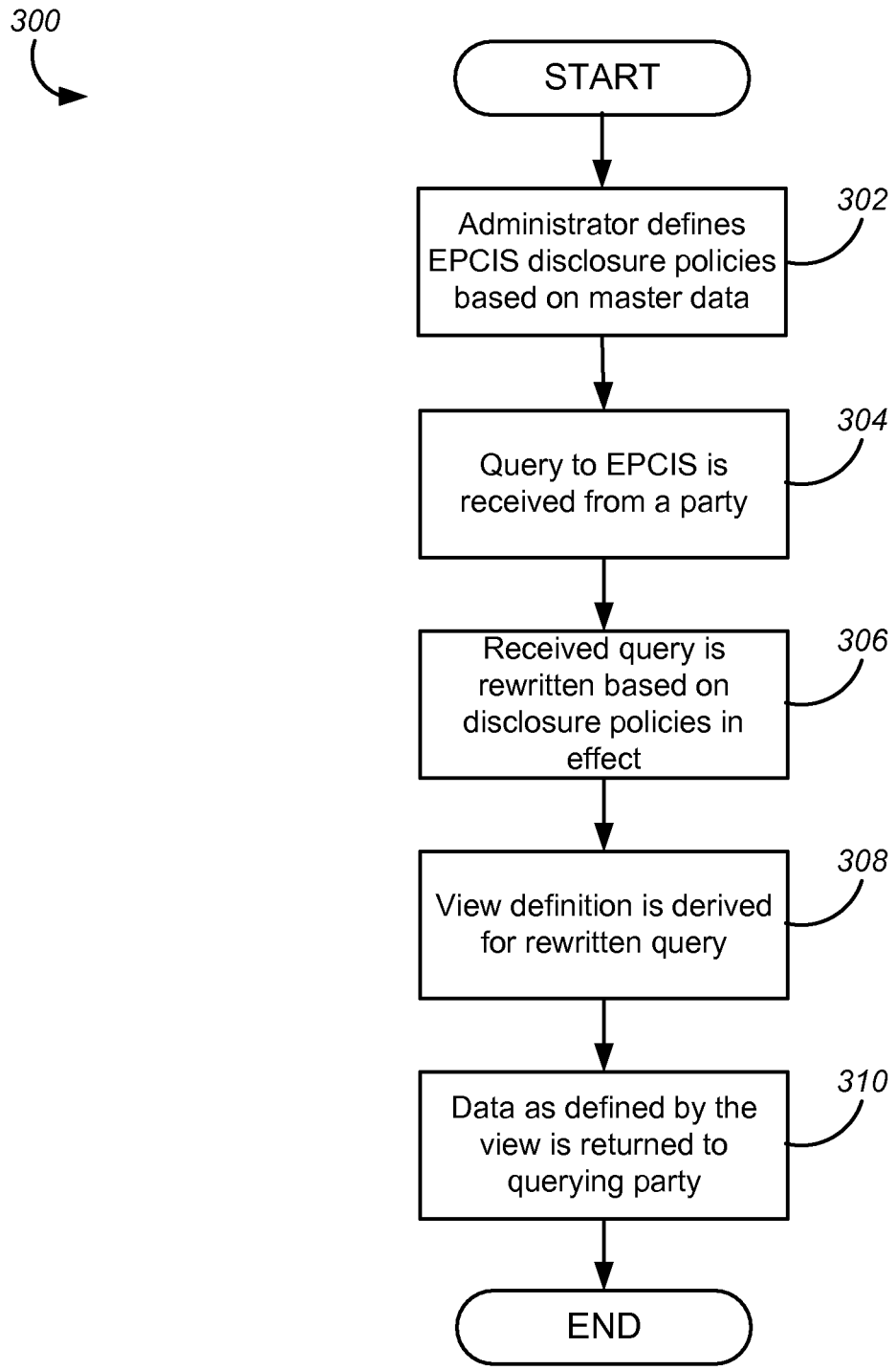
FIG. 3 shows a schematic process for enforcing data disclosure control in accordance with one embodiment of the invention.

FIG. 3 shows a process (300) for enforcing data disclosure control in accordance with one embodiment. As can be seen in FIG. 3, the process starts with an EPCIS administrator defining a disclosure policy for the EPCIS (step 302). The disclosure policy includes a set of one or more rules, typically one rule for each type of entity. It should be noted that not every entity must have a rule defined. Depending on the metadata definitions, a rule for one entity can refer to several database objects (typically, tables and views). For example, if a product policy rule declares the attributes that can be disclosed and the conditions under which these attributes can be disclosed, both the Product and the ProductAttributes tables are affected, as can be seen in FIG. 2. In some implementations, the effect of defining policies on entities is that security views on relational database objects are created. If complex operators are used in the query interface such as the hypothetical EPCIS query operator "get-children-of" for traversing a hierarchy, the resulting view definitions may be (deeply) nested and may reference several database objects.

Next, a query is submitted to the EPCIS (step 304). The query is rewritten based on the policies that are in effect (step 306). An incoming query is first translated such that the query references the database objects according to the relationships between database objects defined in the metadata. Then, the query is transformed such that the query uses the appropriate security views instead of the original database objects.

After rewriting the query, view definitions are derived from the policy rules (step 308). By way of example, the derivations of the view definitions will be described here in terms of relational database objects and a relational database system. It should however be noted that the derivation of the view definitions can also be implemented using a different data model. In the relational database implementation of the EPCIS repository, attributes used in queries map to columns in database tables or views.

For each combination of a user role r and a table t in a database that is to be protected according to policies and the metadata, a special view named v_r_t exists that has the same schema as t and that defines which table cells in t that can be disclosed to r. In most real-world application domains for EPC data repositories, the number of roles |r| and the number of tables |t| are small and the maximum number of views is |r|*|t| is sufficiently small for all practical purposes.

The query rewrite method is based on a table semantics model, where the main idea is that attribute values which are not to be disclosed will be replaced by NULL values. For each combination of a table t that can be queried according to the query interface of the EPCIS and a user role r, zero or more security policies can be created. For practical purposes, the number of security policies can be restricted to zero or one policy per role and table. Each policy is a collection of rules. A rule specifies the name of the table (t), the set of column names of t whose values may be disclosed (A), and the condition (c), for example, a complex Boolean expression, under which the values in A for a row in t may be disclosed.

A policy rule can be compared to an SQL view on table t, where A is the SELECT list, and c is the expression in the WHERE clause, illustrated below.

```
CREATE VIEW
    <view_over_t_for_role_r_according_to_the_policy_rule>
    AS
SELECT A
FROM t
WHERE c
```

Finally, the data defined by the view is returned to the querying party (step 310). The data returned by the view defines exactly the attribute values of rows in t that may be disclosed to users having the role r. No other values of rows in t will be disclosed.

When a query q that references a table t is issued by a user who has role r, every occurrence of a table t in q is replaced by its respective view v_r_t, as will be described in further detail below by way of example. These views are created when the security polices for r and t are created. If any policy for the combination r and t is modified, the view v_r_t is dropped and a new view definition with the same name is created. The new view again reflects the current disclosure rules.

In one embodiment, the view definition method works as follows. Let P be the set of all policies. Let (r, t, A, c) be a policy rule. Let $U(r', t')=\{(r, t, A, c) \in P | r=r' \wedge t=t'\}$ be the set of rules for a table t' of policies that pertain to a role r'. The WHERE clause of the view is a logical OR of all conditions in U. For each column name a of t, if the column name does not appear in an attribute set A in U, the column appears in the column list of the SELECT clause as:

NULL as a

Otherwise, let C be the set of conditions that have been defined for attribute a: $C(r', t', a) = \{p.c | p \in U(r', t') \wedge a \in p.A\}$. Then, the column a appears as an expression that involves a logical OR of all conditions c1, ..., cn in C:

CASE WHEN <c1> OR ... OR <cn> THEN a ELSE NULL AS a

Enabled and Disabled Policies

In various embodiments of the invention, a security administrator of an EPCIS can activate/enable or deactivate/disable a subset of the policies. This can be convenient when an EPCIS installation is undergoing security tests by a security administrator. Only the policies that are enabled are used in the security view definition process. Enabling and disabling individual policies can be implemented by dropping all policies and creating new views according to the current policies. Of course, it is also possible to analyze what policies have been disabled and enabled and to drop and recreate only those views whose definition needs to change while leaving all other views unchanged.

A Security Policy Example

The rewriting of queries will now be explained in greater detail by way of example of views that are generated based on policies and how these views are used to rewrite a query. First, assume there is a hypothetical entity E (a, b, c, d, e, f, g). The metadata declares that E refers to two relational tables $t_1$ (a, b, c, d, e) and $t_2$ (a,f,g) (primary keys underlined), where $t_2.a \rightarrow t_1$ is a foreign key constraint between the two tables.

The user has been assigned to role r and three policies $p_1$, $p_2$, and $p_3$ have been created that are all enabled. The policies are illustrated below in Table 1.

TABLE 1

| Policy $p_1$ for role r | Policy $p_2$ for role r | Policy $p_3$ for role r |
|---|---|---|
| Rule 1: | Rule 1: | Rule 1: |
| Table: $t_1$ | Table: $t_1$ | Table: $t_1$ |
| Attributes: a, b | Attributes: a, c | Attributes: a, c, d |
| Condition: $c_1$ | Condition: $c_2$ | Condition: $c_3$ |
| | | Rule 2: |
| | | Table: $t_2$ |
| | | Attributes: a, g |
| | | Condition: $c_4$ |

The resulting views v_r_t$_1$ and v_r_t$_2$ formulated as SQL DDL statements, where <c$_i$> are placeholders for the conditions, are:

```
CREATE VIEW v_r_t1 AS
SELECT a                                              AS a,
    CASE WHEN <c1>         THEN b ELSE NULL    AS b,
    CASE WHEN <c2> OR <c3> THEN c ELSE NULL    AS c,
    CASE WHEN <c3>         THEN d ELSE NULL    AS d,
    NULL                                           AS e
FROM t1
WHERE <c1> OR <c2> OR <c3>
CREATE VIEW v_r_t2 AS
SELECT   a                                    AS a,
         NULL                                 AS f,
         g                                    AS g
FROM     t2
WHERE    <c4>
```

It should be noted that the first element in the SELECT list of v_r_t1, a AS a could have been written as CASE WHEN <c1> OR <c2> OR <c3> THEN a ELSE NULL AS a without altering the semantics of the query. This optimization can advantageously be incorporated into various embodiments. The reason is that the WHERE clause of the query will select only rows that fulfill the expression c1 ∨ c2 ∨ c3. Similarly, the third element of the select list of view v_r_t2, g AS g is equivalent to CASE WHEN <c4> THEN g ELSE NULL AS g Based on these policies, suppose a user in role r submits the query "Get the attribute values for b, c, f, and g from all objects of entity E," which can be translated into the following SQL query:

```
SELECT   b, c, f, g
FROM     t1, t2
WHERE    t1.a = t2.a AND
         <c5>
```

The rewrite method produces the following query by replacing the table references by view names and adjusting the attribute names to reference the respective view.

```
SELECT   b, c, f, g
FROM     v_r_t1, v_r_t2
WHERE    v_r_t1.a = v_r_t2.a AND
         <c5>
```

Security Policy Editor Tool

As was described above, various embodiments provide a web-based graphical user interface tool, referred to herein as a "Security Policy Editor," which can be used to manage the disclosure rules for queries against an EPCIS. This Security Policy Editor will now be described in further detail with reference to the above example of an EPCIS of a pharmaceutical wholesaler that has several trading partners that need to query the EPCIS repository in a secure way. The main focus of the following description will be on the policy rules for one of the partners, Pharmacy 1.

Figure 4:
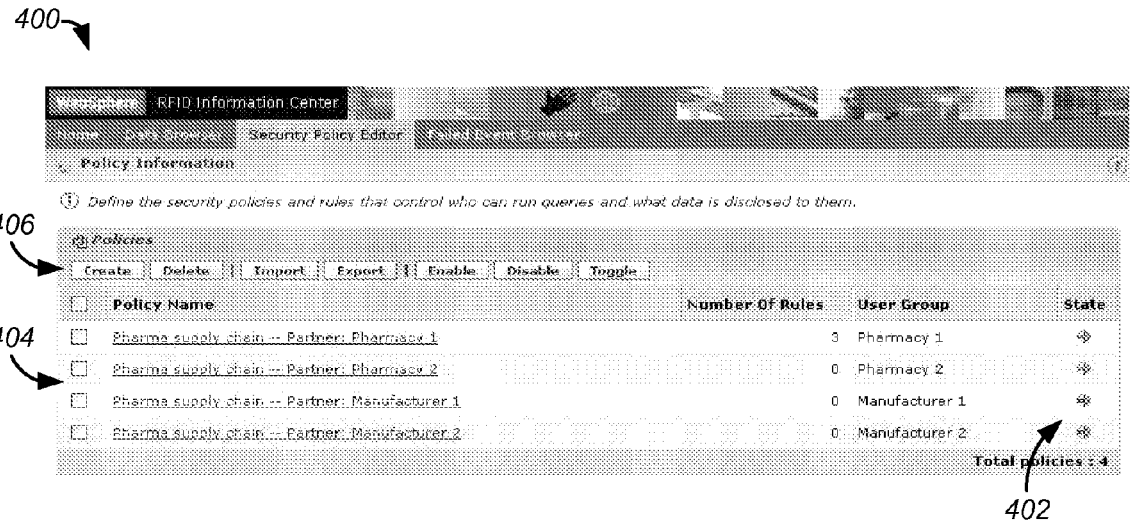
FIG. 4 is a screenshot showing an overview of policies in accordance with one embodiment of the invention.

FIG. 4 is a screenshot (400) showing an overview of the policies that are defined for the wholesaler's EPCIS. As can be seen in FIG. 4, every partner has their own policy that has been set up by the security administrator of the EPCIS. Three policy rules have been defined for Pharmacy 1. The state indicators (402) show that all policies are enabled, that is, queries coming from any of the partners (that is, Manufacturer 1, Manufacturer 2, Pharmacy 1 and Pharmacy 2, respectively) are under disclosure control. The checkboxes (404) indicate that each policy can be selected and subject to one or more operations that are defined by the clickable buttons (406) above the policy listing. That is, each policy can be exported, enabled or disabled, a new policy can be imported, and the states of a set of selected policies can be toggled. Toggling means that if a policy is selected in a checkbox, its state changes, that is, it either changes from enabled to disabled or from disabled to enabled.

Figure 5:
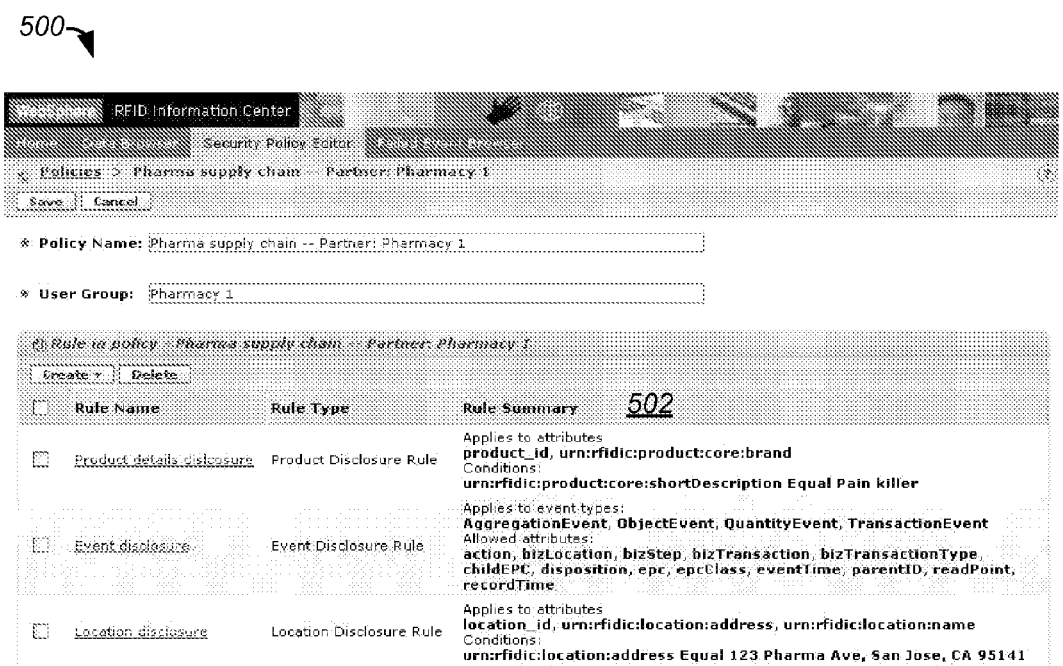
FIG. 5 is a screenshot showing an overview of the policy rules in accordance with one embodiment of the invention.

FIG. 5 shows an overview (500) of the three policy rules pertaining to Pharmacy 1. As can be seen in FIG. 5, the rule summary (502) gives the security administrator of the EPCIS a concise description of the disclosed attributes and the conditions under which the attributes may be disclosed. The policy name and user group are also clearly displayed, and options for creating and deleting policies are provided.

Figure 6:
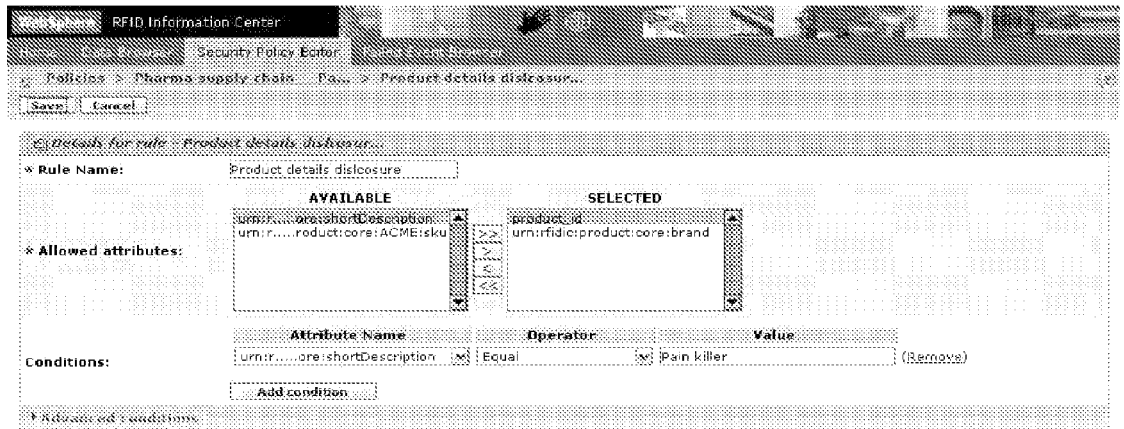
FIGS. 6-9 are screenshots showing policy rules in accordance with one embodiment of the invention.

FIG. 6 shows details for the first rule belonging to the policy of the partner "Pharmacy 1" that declares that any location information (including associated events) that pertains to products which are labeled "Pain killer" can be disclosed to Pharmacy 1. Furthermore, only the product identifier and the brand name are disclosed as product details; the product details "short description" and SKU would yield the value NULL in queries that reference these attributes.

Figure 7:
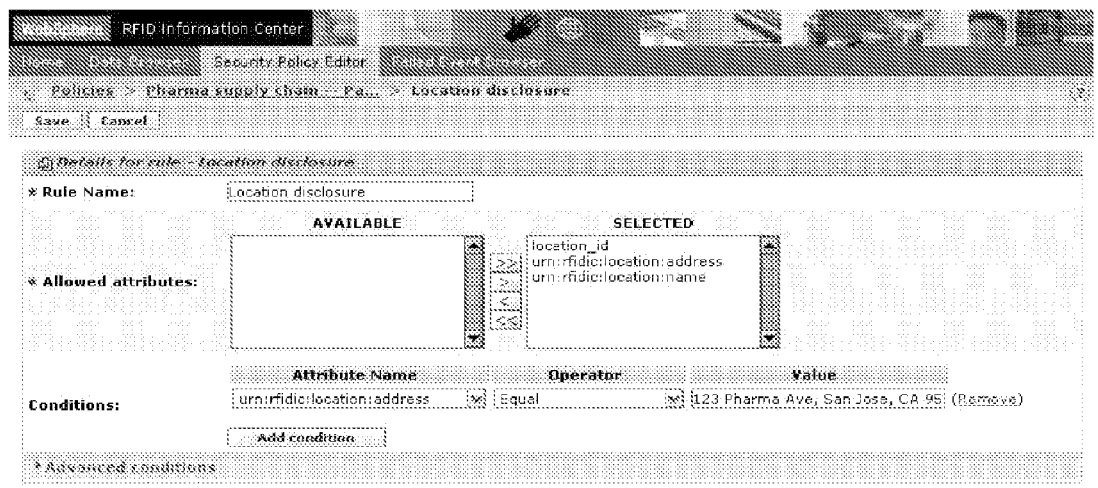

FIG. 7 shows details for the second rule belonging to the policy of the partner "Pharmacy 1" that declares that any information (including events) that pertains to events whose origin is the location "123 Pharma Ave, San Jose, Calif. 95141" can be disclosed to Pharmacy 1. No attributes of the location details are suppressed.

Figure 8:
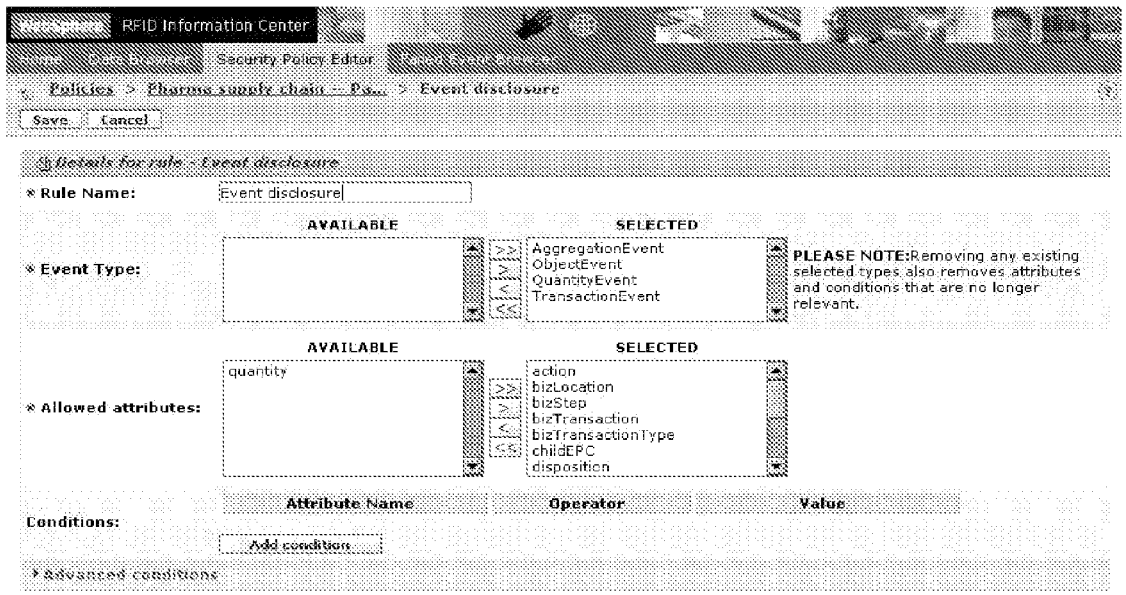

FIG. 8 shows details for the third rule belonging to the policy of the partner "Pharmacy 1." The effect of this rule is that queries coming from Pharmacy 1 that involve event information will never disclose quantity information. If this attribute is referenced in a query of Pharmacy 1, its values will be NULL.

Because of the policy rules for Pharmacy 1, shown in FIGS. 5-7, any query about EPC events against the EPCIS that comes from Pharmacy 1 will return only information that pertain to pain killers only and the location of the events that originate from the location "123 Pharma Ave, San Jose, Calif. 95141." Typically, the location describes where the (RFID, 1D- or 2D-barcode, and so on) readers have sensed the EPC attached to an item. However, events can also pertain to activities other than "reading" codes. An example is packing and unpacking of goods, which is expressed by the so-called AggregationEvent type, defined by EPCglobal (see the event type values in FIG. 8).

Figure 9:
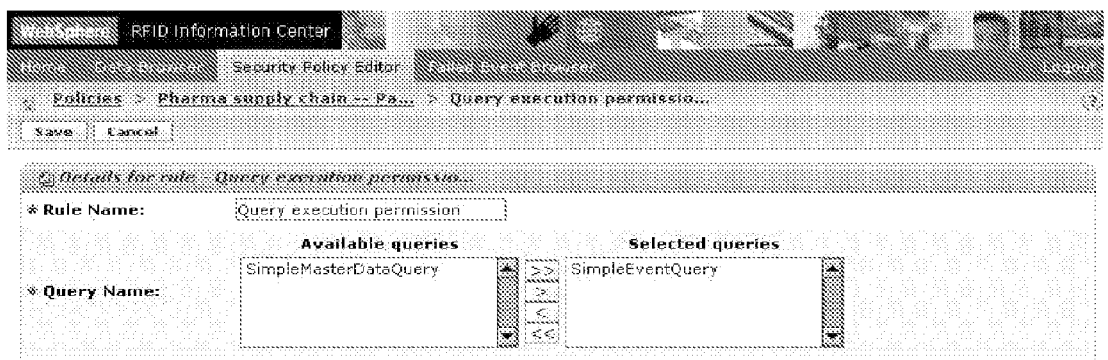

FIG. 9 shows another rule belonging to the policy of "Pharmacy 1." It describes what types of queries (for example, as a web service) Pharmacy 1 can issue to the EPCIS. As can be seen in FIG. 9, only queries of type SimpleEventQuery can be executed, but not SimpleMasterData queries. These types of queries are defined in the EPCglobal standard for EPCIS.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A number of implementations of the invention have been described. Nevertheless, it will be understood that various modifications may be made without departing from the spirit and scope of the invention. For example, the query interface of the EPCIS may be realized as a web service or an application programming interface (API). Entities other than events, products, and locations may be used to specify security policies. A user vocabulary typically specifies such further context types. Furthermore, although the EPCglobal consortium specifies standards for products, items that may be tagged could also be human beings, money, and parts of products (not full products). It should be clear that EPCIS can be used also for tracking these other types of objects. Accordingly, other embodiments are within the scope of the following claims.

The invention claimed is:

1. A computer-implemented method for protecting data residing in a repository of an electronic product code information service against undesired data disclosure, the method comprising:
    defining one or more disclosure policies for an entity representing a set of items sharing a common master data attribute, each item being tagged with an electronic product code and having associated data stored in a relational database in the repository, each disclosure policy including a rule defining what attributes of the entity can be disclosed to a querying party, by creating a security view on one or more relational database objects in the database; and
    enforcing the one or more disclosure policies in response to receiving a query pertaining to an entity, by:
        transforming the received query to use the created security view for the one or more relational database objects pertaining to the entity, and
        returning data defined by the security view to the querying party, thereby only disclosing a subset of the data from the repository, the subset being determined in accordance with the defined one or more disclosure policies.

2. The method of claim 1, wherein enforcing the one or more disclosure policies includes refusing to respond to the received query.

3. The method of claim 1, wherein enforcing the one or more disclosure policies includes responding to the received query with less information than specified in the query.

4. The method of claim 1, wherein defining one or more disclosure policies includes:
    defining a role to be associated with one or more querying parties; and
    associating one or more disclosure policies with the role.

5. The method of claim 1, wherein enforcing the one or more disclosure policies is done transparently without the querying party being aware that the one or more disclosure policies is applied to the query.

6. The method of claim 1, further comprising:
providing an option for a disclosure policy administrator to selectively enable or disable individual disclosure policies.

7. A computer program product for protecting data residing in a repository of an electronic product code information service against undesired data disclosure, comprising:
a non-transitory computer readable storage medium having computer readable program code embodied therewith, the computer readable program code comprising:
computer readable program code configured to define one or more disclosure policies for an entity representing a set of items sharing a common master data attribute, each item being tagged with an electronic product code and having associated data stored in a relational database in the repository, each disclosure policy including a rule defining what attributes of the entity can be disclosed to a querying party, by creating a security view on one or more relational database objects in the database; and
computer readable program code configured to enforce the one or more disclosure policies in response to receiving a query pertaining to an entity, by:
transforming the received query to use the created security view for the one or more relational database objects pertaining to the entity, and
returning data defined by the security view to the querying party, thereby only disclosing a subset of the data from the repository, the subset being determined in accordance with the defined one or more disclosure policies.

8. A computer program product for defining disclosure policies for data residing in a repository of an electronic product code information service, comprising:
a non-transitory computer readable storage medium having computer readable program code embodied therewith, the computer readable program code comprising:
computer readable program code configured to present a user interface through which a user can define one or more disclosure policies for the data residing in the repository;
computer readable program code configured to receive user input defining the one or more disclosure policies for an entity representing a set of items sharing a common master data attribute, each item being tagged with an electronic product code and having associated data stored in a relational database in the repository, each disclosure policy including a rule defining what attributes of the entity can be disclosed to a querying party, by creating a security view on one or more relational database objects in the database; and
computer readable program code configured to apply the defined disclosure policies to the data residing in the repository; and
computer readable program code configured to enforce the one or more disclosure policies in response to receiving a query pertaining to an entity, by:
transforming the received query to use the created security view for the one or more relational database objects pertaining to the entity, and
returning data defined by the security view to the querying party, thereby only disclosing a subset of the data from the repository, the subset being determined in accordance with the defined one or more disclosure policies.

9. The computer program product of claim 8, wherein the user input includes a definition of an action to be taken in response to a query, the action including one or more of: responding with all the requested information, responding with less information than requested, and not responding to the query.

10. The computer program product of claim 8, wherein the user input includes:
a definition of a role to be associated with one or more querying parties; and
an association of one or more disclosure policies with the role.

11. The computer program product of claim 8, further comprising:
computer readable program code configured to receive user input selectively enabling or disabling individual disclosure policies.

12. The computer program product of claim 8, wherein the user interface is a web-based user interface.

* * * * *